United States Patent
Wu et al.

(10) Patent No.: US 6,647,306 B2
(45) Date of Patent: Nov. 11, 2003

(54) INTERFERENCE REMOVAL SYSTEM FOR AUTOMATED PATH PLANNING

(75) Inventors: Wen-Jun Wu, Novi, MI (US); Jonathan Ostling, Auburn Hills, MI (US); Kevin Mojek, Oxford, MI (US); Hugh W Cumming, Orion Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 385 days.

(21) Appl. No.: 09/801,270

(22) Filed: Mar. 7, 2001

(65) Prior Publication Data

US 2002/0151999 A1 Oct. 17, 2002

(51) Int. Cl.[7] .......................... G06F 19/00; G06F 17/50; G06T 17/00
(52) U.S. Cl. ................................. 700/98; 703/1; 703/8; 345/420; 345/622
(58) Field of Search .............................. 700/95, 97, 98, 700/103, 104, 105, 253, 255; 703/1, 6, 7, 8; 345/420, 421, 474, 622

(56) References Cited

U.S. PATENT DOCUMENTS

| | | | | |
|---|---|---|---|---|
| 5,497,453 A | * | 3/1996 | Megahed et al. | 345/422 |
| 5,980,084 A | * | 11/1999 | Jones et al. | 700/95 |
| 5,999,881 A | | 12/1999 | Law et al. | 701/301 |
| 6,044,306 A | * | 3/2000 | Shapiro et al. | 700/90 |
| 6,452,604 B1 | * | 9/2002 | Sato | 345/619 |
| 2002/0123812 A1 | * | 9/2002 | Jayaram et al. | 700/98 |

OTHER PUBLICATIONS

Motion Planning in Virtual Prototyping: Practical Considerations, Hsuan Chang, GE Corporate R&D Center, pp. 427–428 1995.

Assembly Maintainability Study with Motion Planning, Hsuan Chang, GE Corp. R&D Center, and Tsai–Yen Li, Stanford University, IEEE International Conference on Robotics and Automation, pp. 1012–1019 1995.

Design For Maintenance By Constrained Motion Planning, Tsai–Yen Li, Stanford University and Hsuan Chang, GE Corporate R&D Center, DE–vol. 83, 1995 Design Engineering Technical Conferences vol. 2, ASME 1995, pp. 869–876.

* cited by examiner

Primary Examiner—Leo Picard
Assistant Examiner—Paul Rodriguez
(74) Attorney, Agent, or Firm—Ralph E. Smith

(57) ABSTRACT

An interference removal system is provided for determining the possible removal of a component from an assembly where the component to be removed is in an environment including other components that interfere with its removal. The system uses dimensional data to define the removal component and its environment including other components. A boundary space is established around the removal component where the boundary space includes another component interfering with removal of the removal component. The removal component then randomly moves within the boundary space until it is free from interference with its environment. The system is intended to assist in automated path planning by removing initial interference conditions.

11 Claims, 6 Drawing Sheets

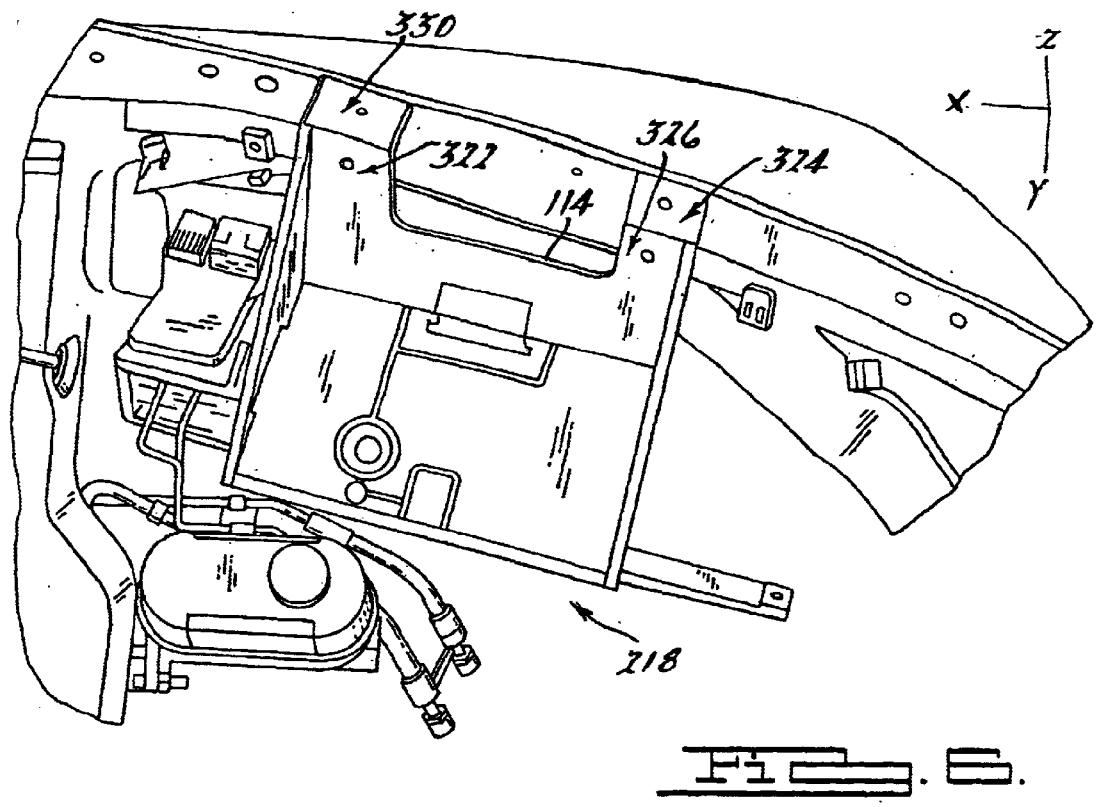
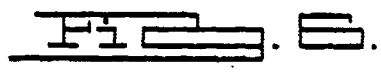
FIG. 6.
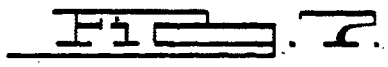
FIG. 7.
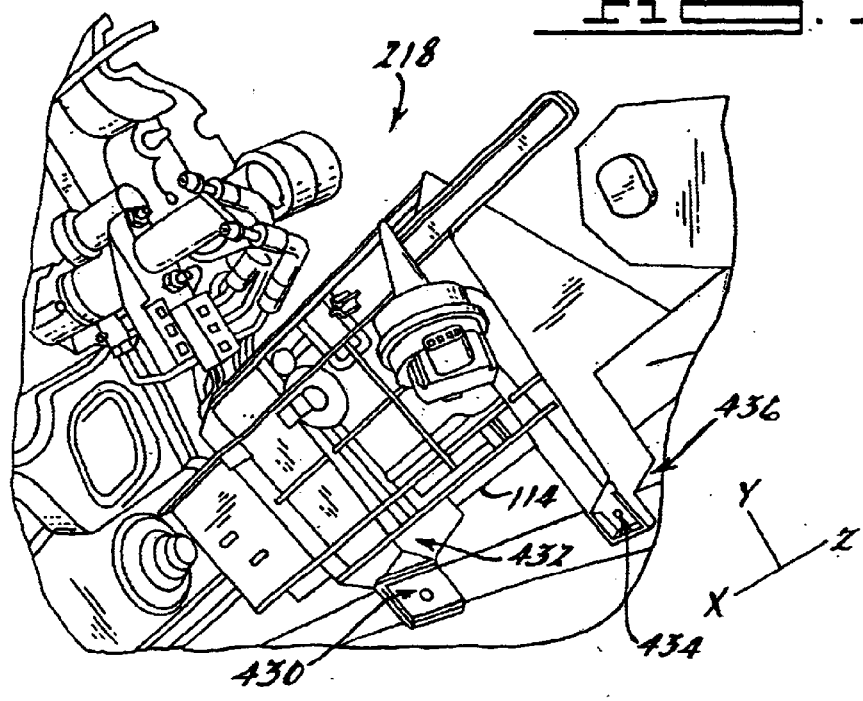

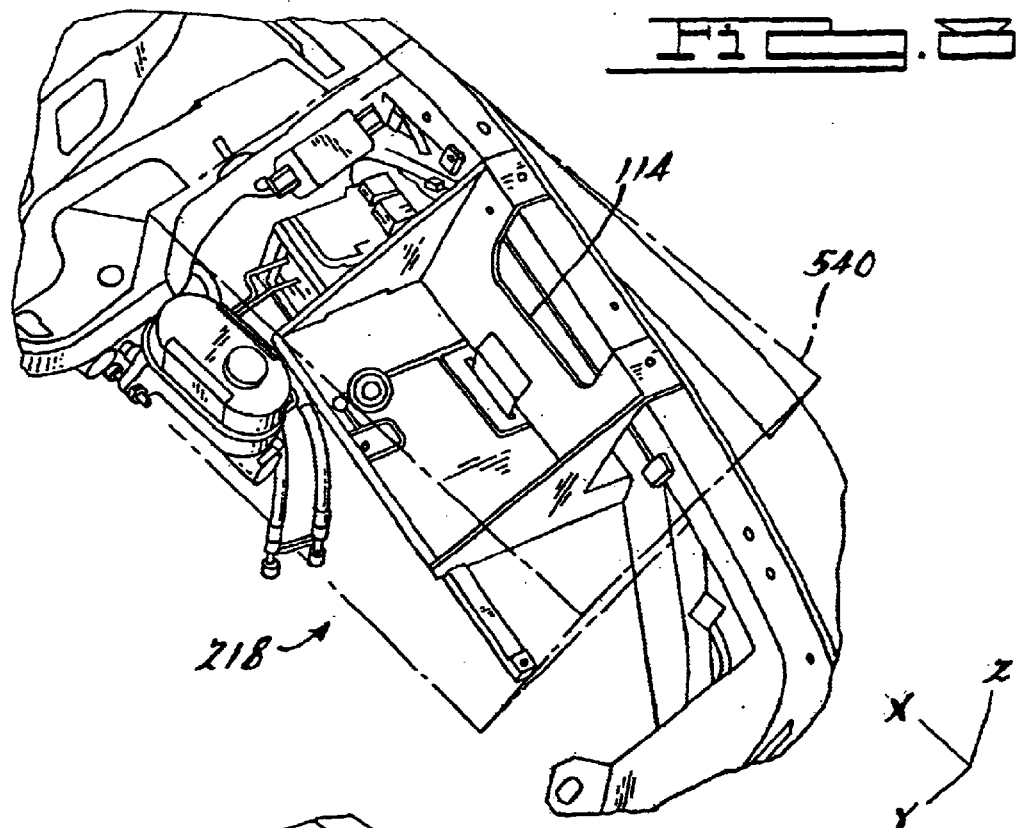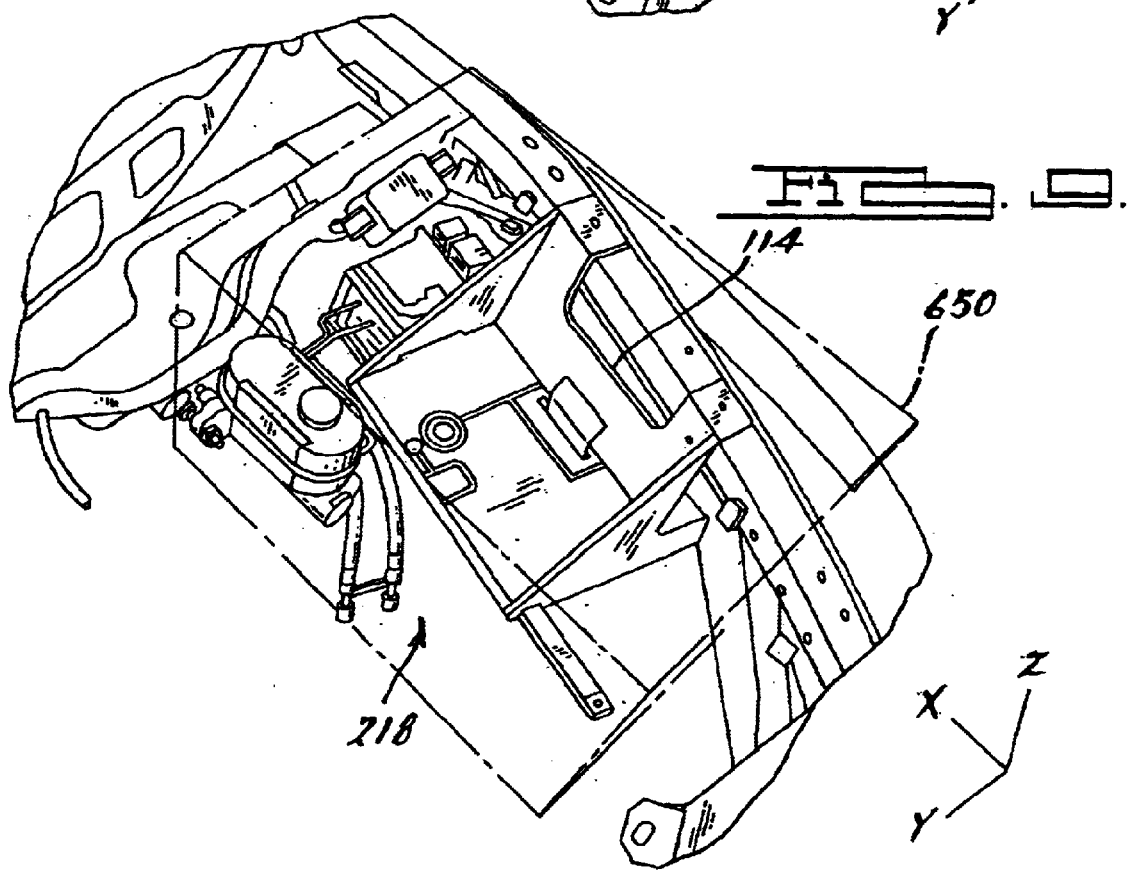

INTERFERENCE REMOVAL SYSTEM FOR AUTOMATED PATH PLANNING

FIELD OF THE INVENTION

The present invention relates generally to automated path planning and, more particularly, to a system for removal of interference between a component and its environment to allow for removal of the component through automated path planning.

BACKGROUND OF THE INVENTION

Advances in computer aided design (CAD) visualization and automated path planning systems have led to large assembly quick development and team-based electronic design of manufactured assemblies. Automated path planning, for example, in the design of a vehicle allows for analysis of the removal of any component in the vehicle assembly. This aids the designer in determining if a removal path is available for a particular component in the overall assembly configuration. The resulting study is important in designing the assembly in a manner that will allow for replacement of the component part in the vehicle after assembly. Automated path planning saves time and cost over the past method of developing a prototype before checking path planning.

In automated path planning, a difficult issue is the resolution of initial condition problems. Initial condition problems arise when a component part is interferent with its environment in such a manner that it cannot readily free itself through standard automated path planning. An initial condition problem can occur in several different ways. Frequently, a component is within tight clearance of its surrounding environment, and may be "boxed in" to the extent that it cannot freely move from its starting location. A component can also have several points of contact with its environment. As a result, automated path planning may not succeed in freeing the part from its environment.

A manual solution to an initial condition problem can take several man-hours in physically attempting to move the component in a multitude of directions until the component is freed. This is an inefficient and time-consuming process. A CAD or software solution may not exist, as the component may be locked in position due to its proximity to its environment including surrounding component parts. A CAD or software application may not offer a means for resolving initial condition problems.

Therefore, there is a need for a system for removal of initial condition problems in automated path planning. A system is required that will efficiently and effectively resolve initial condition problems while allowing the operator the ability to exercise control over the manner of resolution.

SUMMARY OF THE INVENTION

The present invention provides a solution to initial condition problems in automated path planning. The disclosed system removes initial condition problems by allowing the component to overlap other components interfering with the component to be removed.

In operation a boundary is established around the removal component. This boundary is then expanded to create a workspace for the removal component to move within. The removal component is then allowed to move randomly within the workspace until it is free from interference with its environment. The removal component can overlap other components within the workspace but not intersect the boundary of the workspace. The system user can adjust the size of the workspace to simulate differing degrees of freedom from its environment for the removal component. If the system is successful, the removal component will be in a position for removal with automated path planning.

BRIEF DESCRIPTION OF THE DRAWINGS

Additional benefits and advantages of the present invention will become apparent to those skilled in the art to which this invention relates from a reading of the subsequent description of the preferred embodiment and the appended claims, taken in conjunction with the accompanying drawings, in which:

FIG. 6 is a diagram illustrating a top view of the battery tray in its environment with identification of points of interference;

FIG. 7 is a diagram illustrating a bottom view of the battery tray in its environment with identification of points of interference;

FIG. 8 is a diagram illustrating a boundary area around the battery tray subassembly;

FIG. 9 is a diagram illustrating an enlarged boundary area around the battery tray subassembly; and, FIG. 10 is a diagram illustrating the battery tray subassembly in a position found with no interference.

DETAILED DESCRIPTION OF THE PREFERRED EMBODIMENTS

Figure 1:
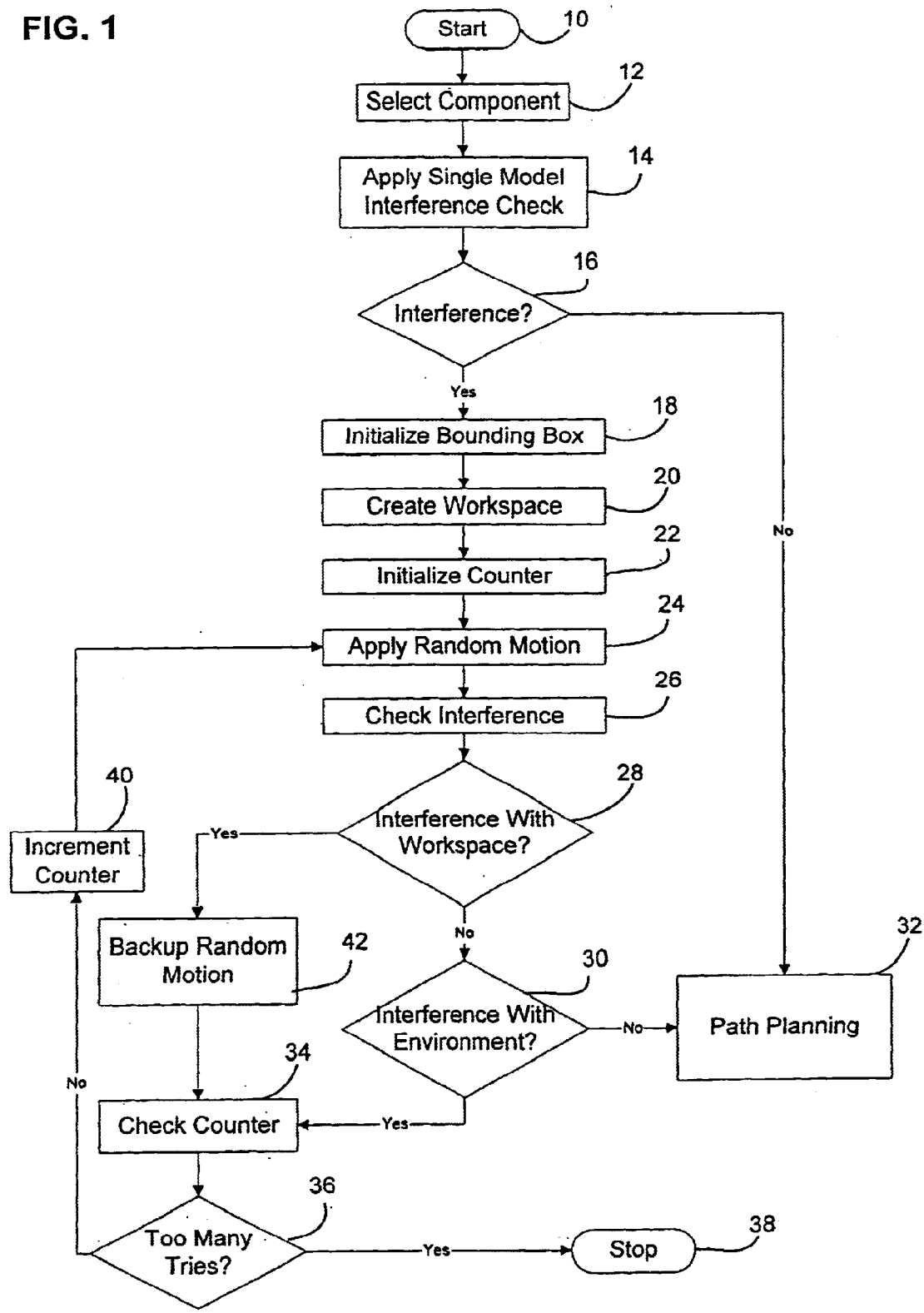
FIG. 1 is a flowchart of a preferred embodiment of the interference removal system according to the present invention.

A preferred embodiment of the invention is illustrated in FIG. 1. The embodiment may be implemented in software and can operate with multi-dimensional images.

Starting at step 10 the system selects a component designated as the removal component at step 12 for intended removal from its environment. This removal component will then be initially checked for interference with its environment. This can be accomplished by applying an interference check at step 14 though a path planning system or other means. If it is already known that an interference condition exists then the initial step of checking is not necessary.

If the initial interference check at decision block 16 shows no interference, automated path planning, illustrated by process 32 can be performed. Alternatively, if there is an interference condition then the removal component will not pass the interference check at decision block 16.

The first step in removing the interference is to create a boundary in step 18 around the removal component. This boundary is of size and dimension to contain the removal component. This boundary can be in the form of a geometric box around the removal component. Alternatively, the boundary can be any other shape or form that will encompass the removal component.

Next, a workspace is created around the removal component in step 20. This workspace can be created by expanding the boundary area in one or more directions. The workspace can also be independent of the boundary as created in step 18. The workspace, like the boundary, is of size and dimension to contain the removal component. The workspace can also be a box or any other shape or form that will encompass the removal component. The workspace will be larger than the removal component to allow for movement of the removal component within the workspace. The workspace will include within its boundary at least one other component that interferes with the removal of the intended removal component.

As an example, consider the boundary as created in step 18 as a box around the removal component with the lines of the bounding box either parallel or perpendicular to the x, y, and z axes. A workspace as in step 20 is then created by expanding the bounding box in one or more +x, −x, +y, −y, +z, or −z directions. In expanding the bounding box it will overlap at least one other component that interferes with the removal of the removal component. By creating the expanded bounding box (workspace) the removal component is allowed to have greater room for movement in avoidance of the interfering components in the environment.

After the workspace is created then the removal component is allowed to randomly move within the workspace as illustrated in step 24. Before random motion is initiated a counter in step 22 is set to count the number of iterations of random motion followed by checking for interference with the environment. An end counter is also set to a number representing the maximum number of iterations of random motion and checking before the system is stopped. This allows the system to halt if a non-interfering position cannot be found within a certain number of iterations.

During the random movement of step 24 the removal component can overlap components within the workspace. This allows the removal component to avoid the interference of other components within the workspace. During random motion the removal component cannot intersect or overlap the boundary of the workspace.

An example of source code for a random motion algorithm in the C programming language is as follows:

```
int seed = 1;
int     a = 16807;
int     m = 21147483647;
int     q = 127773;
int     r = 2836;
float random(void)
{
        int     lo, hi, test;
        float           rValue;
        hi = seed/q;
        lo = seed % q;
        test = a * lo—r * hi;
        if (test > 0)
                seed = test;
        else
                seed = test + m;
        rValue = (float)seed / (float)m;
        return(rValue);
}
```

Other algorithms can also be used to randomly move the removal component within the workspace.

After each random movement of the removal component, it is evaluated for interference with its environment and the workspace as illustrated in step 26. First, a check for interference with the workspace in decision block 28 checks for intersection of the removal component with the boundary established by the workspace.

If there is interference with the workspace then the step of random movement that caused the interference is backed up in step 42 so that the removal component is no longer interferent with the workspace. If there is no interference with the workspace then the removal component is checked for interference with its environment in decision block 30. This involves checking for interference between the removal component and any other component including other components within the workspace.

In the event of interference with either the workspace or the environment then the counter is checked in step 34 to determine if a maximum number of iterations have occurred. If so, the system is stopped in step 38. Otherwise, the counter is incremented in step 40 and the system logic loops back to perform another iterative step of random motion in step 24 followed by checking for interference in step 26.

If the interference check shows no interference with both the workspace and the environment then the removal component is in a non-interference position with its environment that will allow application of automated path planning as illustrated in step 32.

FIGS. 2 through 10 illustrate the operation of the invention on a battery tray subassembly for a vehicle. These figures are intended to illustrate one of countless applications and implementations of this invention.

Figure 2:
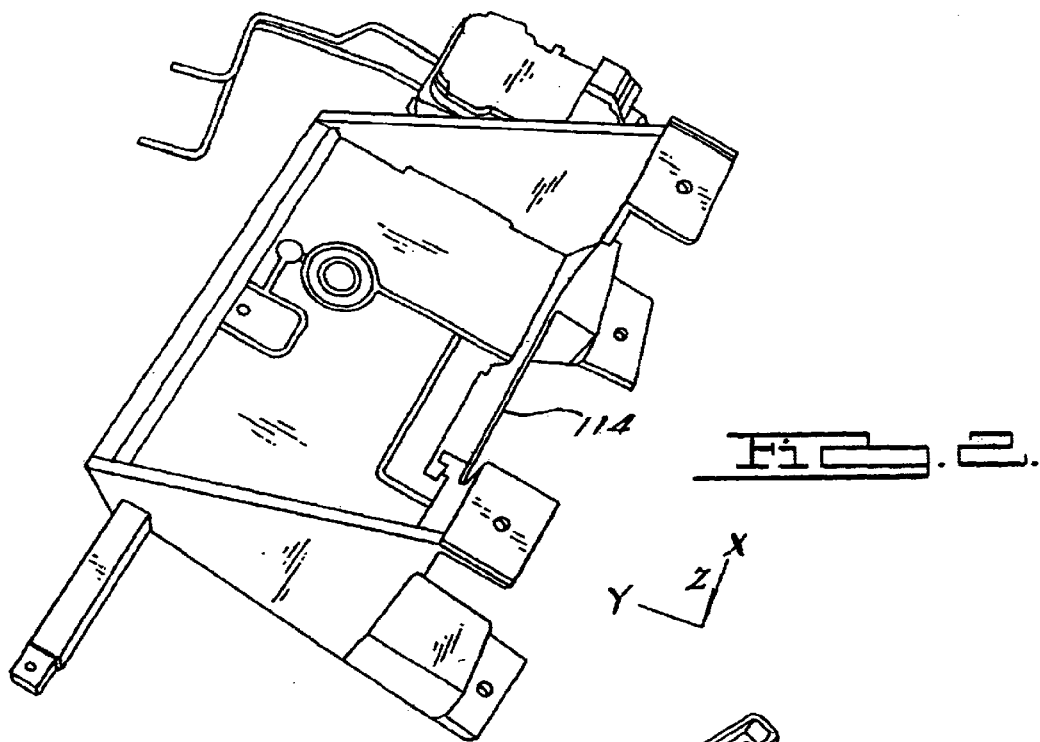
FIG. 2 is a diagram illustrating a battery tray subassembly as a prospective removal component.
Figure 3:
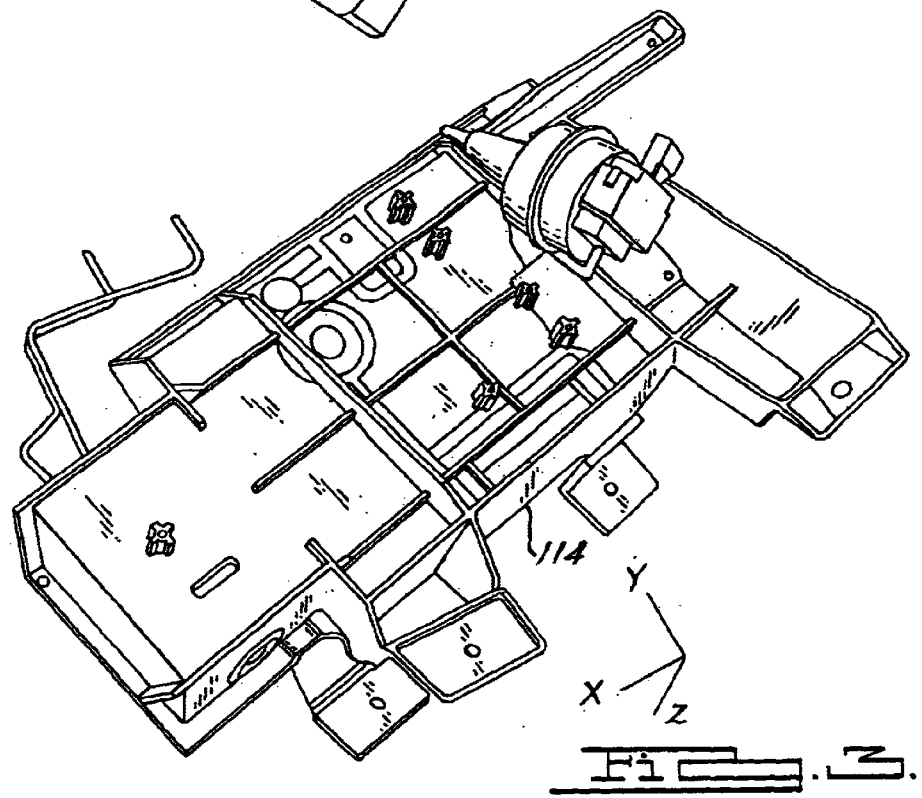
FIG. 3 is a diagram illustrating the underside of the battery tray subassembly of FIG. 2.
Figure 4:
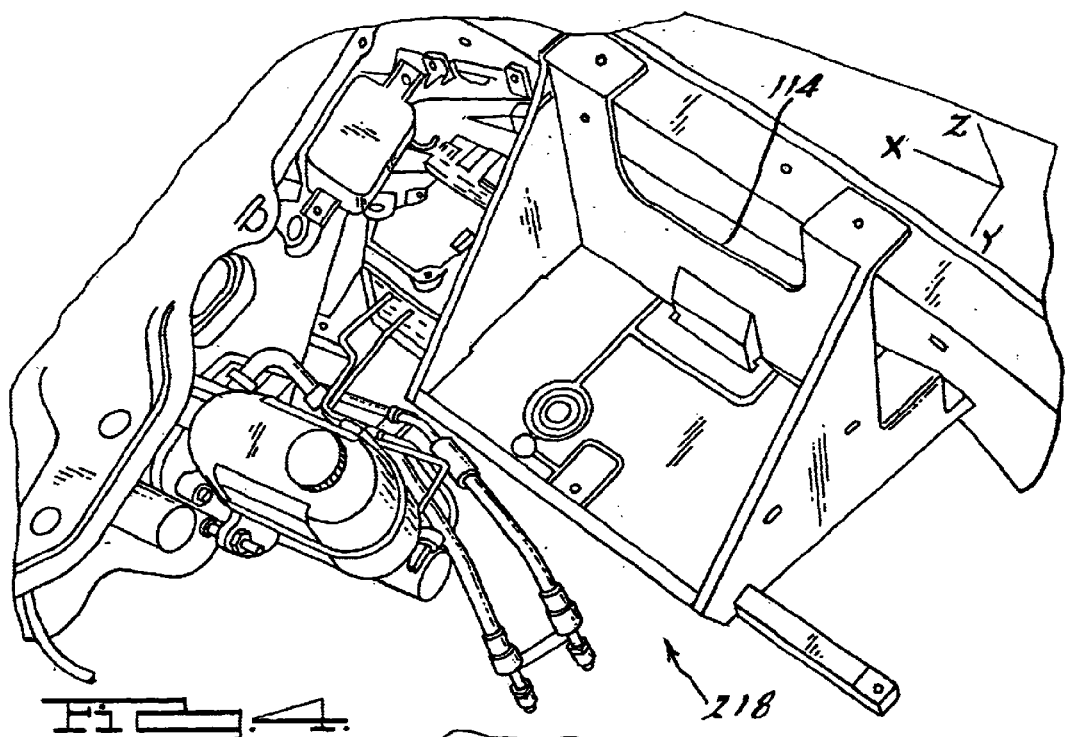
FIG. 4 is a diagram illustrating the battery tray subassembly and its environment.
Figure 5:
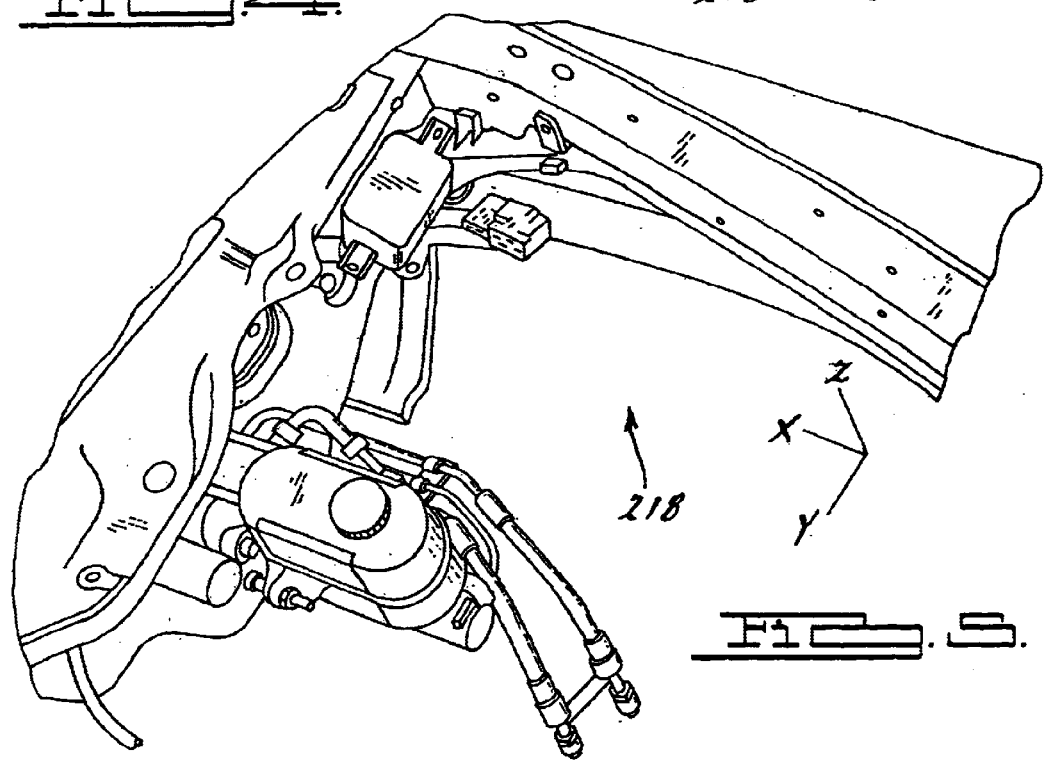
FIG. 5 is a diagram illustrating the environment of the battery tray subassembly.

FIG. 2 illustrates a battery tray subassembly (with ABS system) 114 for a vehicle. FIG. 3 illustrates the underside of the battery tray 114. FIG. 4 illustrates the battery tray in its environment 218, showing its close proximity to other components. FIG. 5 illustrates the environment 218 of the battery tray subassembly.

FIG. 6 illustrates the battery tray 114 in its environment 218 identifying four points of interference between the battery tray subassembly and its environment. The four points of interference 330, 322, 324, 326 are visible from a top view. FIG. 7 illustrates a bottom view of the battery tray 114 in its environment 218 with four additional points of interference 430, 432, 434, 436.

Based on the several points of interference 330, 322, 324, 326, 430, 432, 434, 436 between the battery tray subassembly and its environment, removal of the battery tray through automated path planning would likely fail. For example, if the battery tray subassembly is selected in step 12 and a interference check is applied as in step 14 the battery tray would return the result of interference in decision block 16.

FIG. 8 illustrates the battery tray 114 in its environment 218 with a bounding box 540 around the removal component (i.e. battery tray). The bounding box 540 as created in step 18 encompasses the removal component 114. FIG. 9 illustrates the expansion of the bounding box to form a workspace 650 for the removal component 114. FIG. 9 illustrates an example of a workspace as created in step 20.

Figure 10:
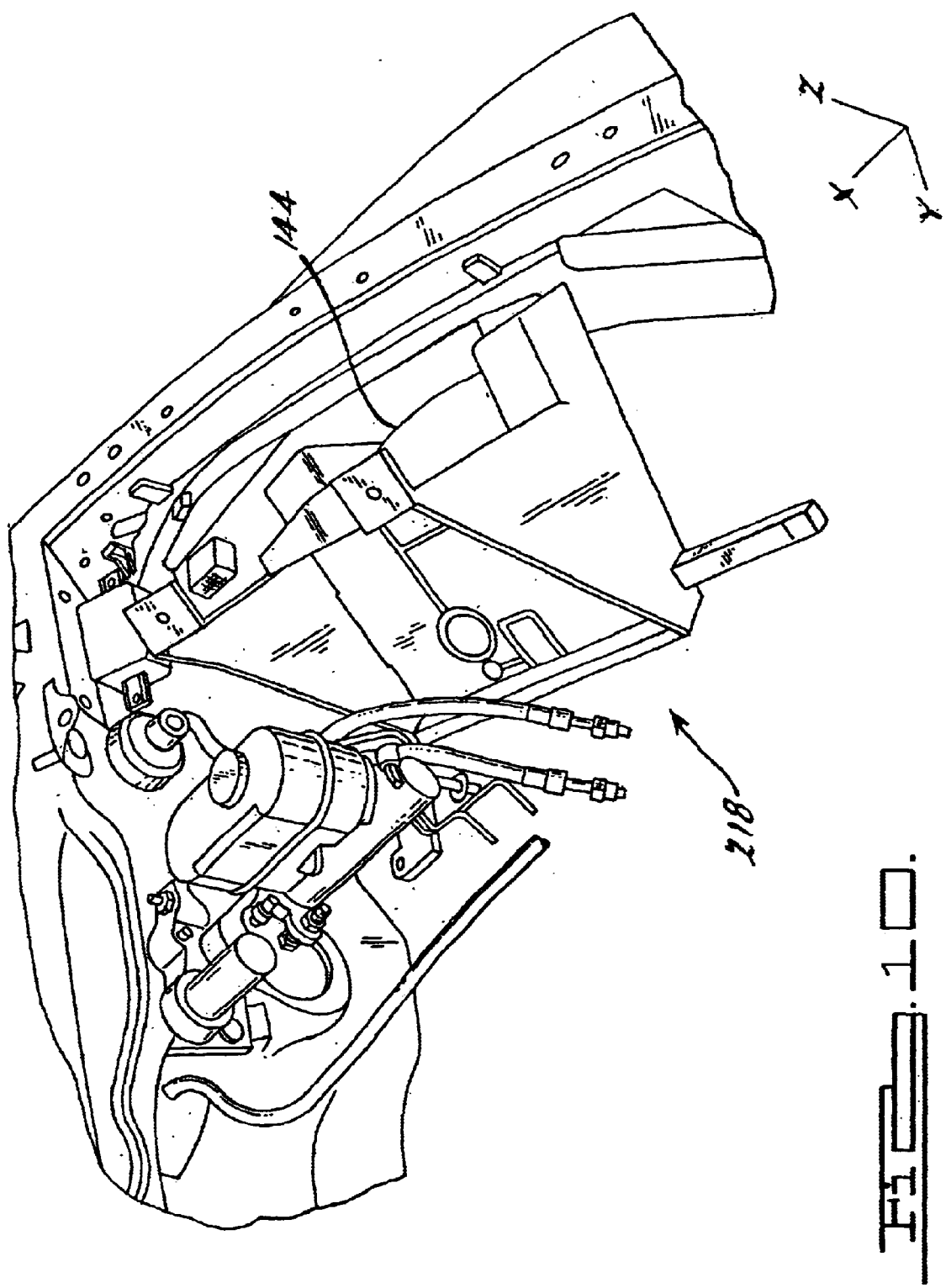

FIG. 10 illustrates successful application of random motion and interference checking. The removal component 114 is in a position with no interference with the environment.

FIG. 10 illustrates the result of applying random motion of step 24 to the removal component 114 while checking for interference in step 26. It can be presumed that several iterative steps of random motion in step 24 were followed by checking for interference in step 26 before the removal component 114 was free of interference with both the workspace as checked in decision block 28 and the environment as checked in decision block 30.

While the invention has been illustrated in an exemplary preferred embodiment, it will be understood that the principles of the invention can be applied in a variety of different situations. Accordingly, the invention is capable of certain modification and change without departing from the spirit of the invention as set forth in the appended claims.

What is claimed is:

1. A method for determining possible removal of a first component from an assembly, wherein at least one other component interferes with the removal of the first component from the assembly, comprising:

providing dimensional data for the first component and the at least one other component;

defining a boundary space surrounding the first component, the boundary space having dimensions greater than the first component such that at least a portion of the at least one other component falls within the boundary space;

simulating random movement of the first component within the boundary space, checking for interference between the first component and the second component or the first component and the boundary space; and reversing the simulated random movement whenever the first component intersects the boundary space, thereby determining the possible removal of the first component from the assembly.

2. The method of claim 1 wherein said boundary space comprises:

a box having planar boundary surfaces.

3. The method of claim 1 further comprising:

iteratively simulating the random movement of the first component within the boundary space until removal of the first component from the assembly is accomplished without interference or until a predetermined number of iterations have occurred.

4. A computer-implemented method for facilitating automated path planning by removing initial interference conditions between a multi-dimensional removal component and a multi-dimensional environment comprising:

creating a multi-dimensional representation of an environment comprising the removal component and at least one other component;

creating a first boundary space for the removal component wherein the first boundary space is a multi-dimensional representation of a boundary within the environment that encompasses the removal component;

creating a second boundary space of the removal component by expanding the first boundary space in at least one direction wherein the second boundary space overlaps at least a portion of the at least one other component interfering with the removal component;

applying random motion to the removal component causing movement of said removal component within the environment wherein the movement of said removal component is within the second boundary space;

checking for interference between the removal component and the second boundary space; and, checking for interference between the removal component and any other component within the environment, whereby the removal component is allowed to move to a position within the environment that does not interfere with any other component.

5. The method of claim 4 further comprising:

establishing a counter used in performing iterations;

setting said counter to an initial value and setting a terminal value for said counter;

while the removal component is in contact with the second boundary space or another component and the counter value is not equal to said terminal value then iteratively performing the following:

a. applying random motion to the removal component causing movement of said removal component within the environment wherein the movement of said removal component is within the second boundary space;

b. checking for interference between the removal component and the second boundary space;

c. checking for interference between the removal component and any other component within the environment; and d. incrementing said counter.

6. The method of claim 4 wherein the first boundary space comprises:

a box having planar boundary surfaces.

7. The method of claim 6 wherein the box is of minimal volume while encompassing the removal component.

8. The method of claim 4 wherein the second boundary space comprises a second box wherein the lines forming the second box are parallel to one of the group consisting of the x, y, and z axis.

9. The method of claim 4 further comprising:

reversing the movement caused by random motion if the removal component intersects the second boundary space.

10. A computer-implemented interference removal system for removing interference between a multi-dimensional removal component and a multi-dimensional second component within a multi-dimensional environment comprising:

a boundary module for creating a boundary space encompassing the removal component and at least a portion of the second component;

a random motion module for applying random motion to the removal component wherein the removal component in random motion overlaps any portion of the second component within the boundary space; and, an interference checking module for checking for interference between the removal component and the second component or the removal component and the boundary space for the result of no interference, wherein the random motion module reverses the random motion of the removal component if the removal component intersects the boundary space.

11. The computer-implemented interference removal system of claim 10 further comprising:

a recursive processing element that controls the random motion module and interference checking module by recursively calling the random motion module and the interference checking module until the result of no interference between the removal component and the second component or until a predetermined number of iterations have occurred.

* * * * *